United States Patent [19]

Case

[11] Patent Number: 5,110,440
[45] Date of Patent: May 5, 1992

[54] ROLL IMMERSION SYSTEM

[75] Inventor: Leo L. Case, Troy, Mich.

[73] Assignee: Elcoat Systems, Inc., Warren, Mich.

[21] Appl. No.: 156,204

[22] Filed: Feb. 16, 1988

[51] Int. Cl.$^5$ ..................... C25D 17/00; B65G 49/02; B05C 3/02
[52] U.S. Cl. ..................... 204/300 EC; 204/299 EC; 204/198; 204/199; 118/416; 118/423
[58] Field of Search ............... 204/299 EC, 300 EC, 204/180.7, 180.2, 181.1, 181.2, 181.3, 180.6, 181.4, 198, 199, 200, 202, 203, 204, 205, 212, 213, 214, 215, 216, 217, 218, 181.6, 181.7; 104/35, 44, 37, 36, 38; 110/75, 409, 412, 416, 423

[56] References Cited

U.S. PATENT DOCUMENTS

| | | | |
|---|---|---|---|
| 2,598,163 | 5/1952 | Halls | 118/416 X |
| 2,658,008 | 11/1953 | Williams et al. | 118/416 X |
| 3,105,776 | 10/1963 | Weyhmueller | 118/416 X |
| 3,300,400 | 1/1967 | Burnside et al. | 204/181 |
| 3,388,052 | 6/1968 | Igras et al. | 204/299 EC X |
| 3,705,817 | 12/1972 | Durr | 117/49 |
| 3,730,866 | 5/1973 | Madejczyk | 204/181 |
| 3,839,988 | 10/1974 | Duerr | 118/7 |
| 4,210,505 | 7/1980 | Todoroki et al. | 204/300 EC X |
| 4,560,592 | 12/1985 | Friedland | 427/430.1 |
| 4,579,062 | 4/1986 | Clark et al. | 104/89 |
| 4,772,374 | 10/1988 | Urquhart et al. | 204/300 EC |

FOREIGN PATENT DOCUMENTS

| | | |
|---|---|---|
| 584432 | 1/1947 | United Kingdom . |
| 1395383 | 5/1975 | United Kingdom ............... 118/423 |
| 1434348 | 5/1976 | United Kingdom ............... 118/423 |

OTHER PUBLICATIONS

"Rotodip" an article published on an unknown date in Industrial Finishing a publication by Arrow Press Ltd.

Primary Examiner—John Niebling
Assistant Examiner—John S. Starsiak, Jr.
Attorney, Agent, or Firm—Harness, Dickey & Pierce

[57] ABSTRACT

In a vehicle body processing apparatus, a process tank assembly comprises a plurality of process tanks each having a treatment liquid therein. A carrier supports the body in road position above the tanks. A rotating means rotates the carrier and the body between an upright position above the tanks and an inverted totally submerged position within the tank and then rotates back to the upright position for drainage into the tank. The carrier is separated from the body, cleaned, and returned overhead to the loading end of the apparatus. The liquid-processed body is transported in an inverted position through an oven.

27 Claims, 8 Drawing Sheets

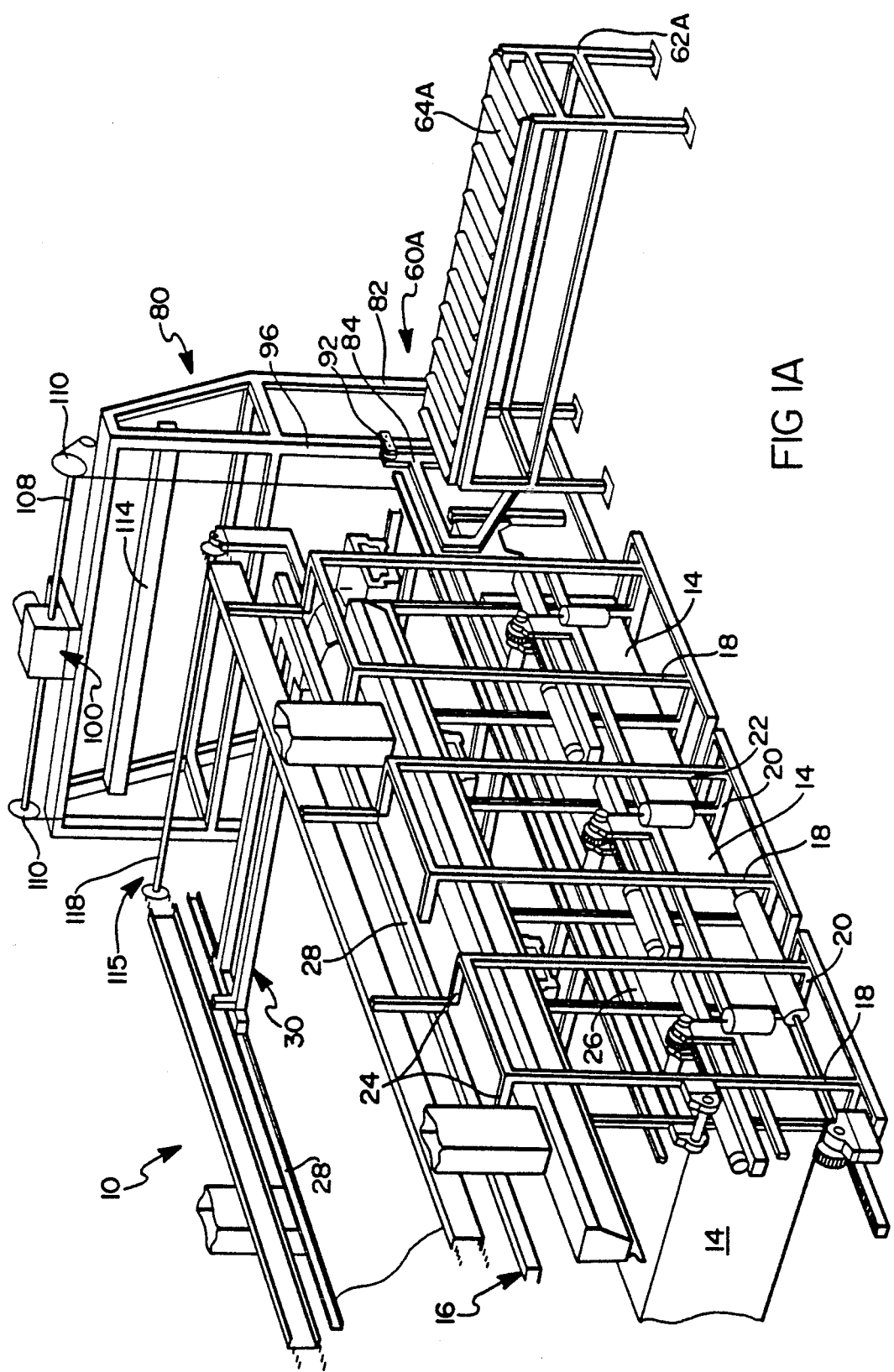
FIG IA

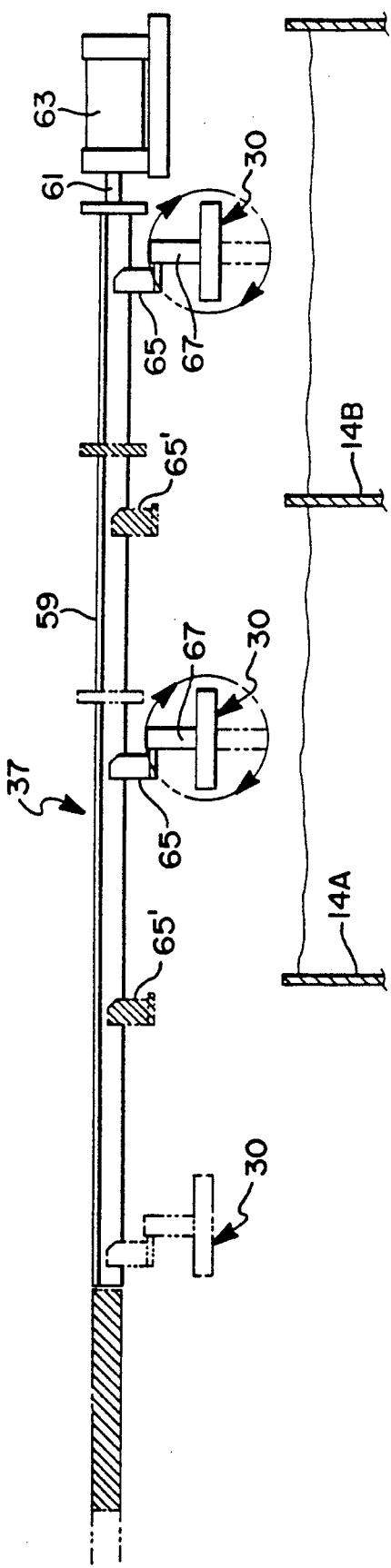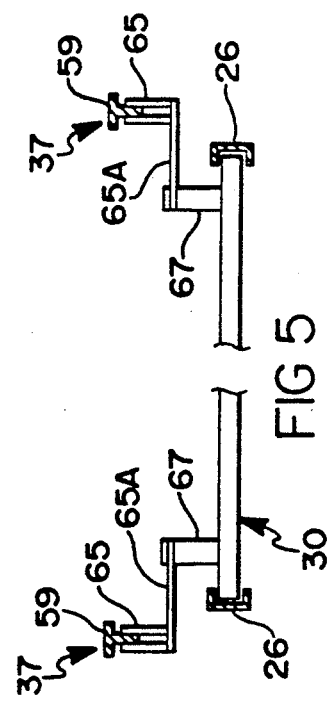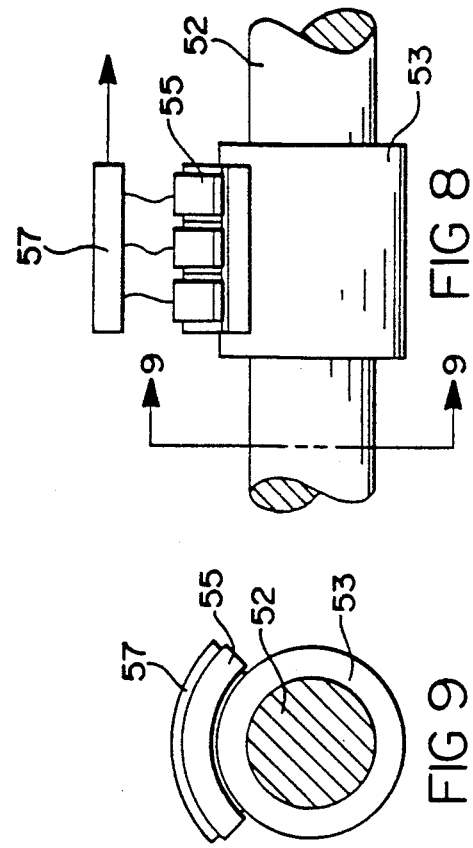

5,110,440

ROLL IMMERSION SYSTEM

TECHNICAL FIELD

This invention relates to the surface treatment or coating of objects, especially large metal objects such as automobile bodies, engine blocks, transformer housings, etc, and in particular, to a treatment by means of a roll immersion process and apparatus.

BACKGROUND OF THE INVENTION

Mass production surface treatment of automobile bodies has involved spray application of treatment fluids or dipping of the body into a treatment solution. Treatment baths may have various purposes including cleaning, rinsing, coating, painting, or other treatment. In the dipping process, it is customary for a conveyor to transport the object directly into the bath, entirely submerging it.

A problem with the usual dipping process is non-uniform surface treatment due to the mechanics of the dipping procedure or to entrapped air bubbles that may result in unequal processing of the surface to be treated. Also, liquid from the bath may be trapped in the body because it is not allowed to drain completely or adequately after the dipping process. This can also cause contamination of subsequent stages including electro-coating baths.

SUMMARY OF THE INVENTION

It is a purpose of this invention to provide a method and means for the conveying and processing of large objects (such as vehicle bodies, engine blocks, etc.) that are difficult to vent and drain. It is an object of the invention to provide such a method and means that improves the quality of the surface treatment and reduces the cost of the treatment and of the apparatus required to carry out the process.

The invention achieves this purpose and object by means of a roll immersion process in which the vehicle body (or other object to be treated) is rotated 180 degrees from an upright position above the treatment tank and then back to the upright position by either continuing the rotation to 360 degrees or reversing the 180 degree rotation. At the 180 degree position, the body is upside down and completely submerged in the tank while the carrier for the body is substantially all above and out of the tank. By processing the vehicle body in the inverted position, dirt are precipitated solids will settle on the tank bottom or on non-cosmetic surfaces of the vehicle body or other object. A series of horizontally separated tanks are provided and the carrier with the body in the upright position is indexed from one tank and treatment to another. At the end of the series of surface treatments, the body is separated from its carrier and transported to drying and curing stages (preferably performed with the body inverted). The vacated carrier is then transported through cleaning and rinse stages to remove uncured paint and foreign material from the carrier so that a clean carrier is delivered back to the load station. In this manner each body to be painted is provided with a freshly cleaned carrier, thus reducing the possibility of surface imperfections due to dirty carriers. Paint build-up on the carriers is substantially eliminated. The arrangement is such that there is no conveyor mechanism located over the bodies being processed thereby eliminating that potential source of dirt, grease, and contamination.

The roll immersion process of the invention facilitates venting and the elimination of air that is trapped in holes in the body being treated thereby enhancing the quality of surface treatment. The process provides for substantially uniform immersion of all surfaces of the body so that all surfaces may be treated the same at each tank or station. Each time the body or other object is rotated, it returns to the upright position and liquid is completely drained back into the tank. The body may be rotated to the upright position for draining at any time in each position without affecting the indexing cycle time.

If electrocoating is a part of the process cycle, electrodes are placed on all four sides and bottom walls of the tank to provide an improved paint film buildup on all surfaces of the vehicle body. This solves a prior art problem of thin body roof films due to poor electrode geometry. "Dead entry" can h=obtained by de-energizing the rectifier until the body is fully immersed. This reduces "hash marking" without the expensive "floating" ground rail commonly used on monorail systems. Multiple voltages can be provided in succeeding positions for closer control of film thickness and more effective rectifier utilization. Multiple tanks may be used at the same or increasing voltages for denser and/or thicker film deposits. Multiple coat or multiple color painting or variable pretreatment processes may be accomplished on the same system simply by transporting the vehicle body on the carrier in the upright position over the undesired stages.

FIGURES IN THE DRAWINGS

Other features and advantages of the present invention will be described hereinafter in the detailed description of the invention and the accompanying drawings wherein:

FIG. 1A is a continuation of the perspective view of FIG. 1;

FIG. 4 is a schematic side elevation of the indexing mechanism;

FIG. 5 is a schematic end elevation taken from the left of FIG. 4;

FIG. 8 is a plan view, broken away on schematic, of a grounding disc; FIG. 9 is a cross section on line 9—9 of FIG. 8;

DESCRIPTION OF THE PREFERRED EMBODIMENT

Figure 1:
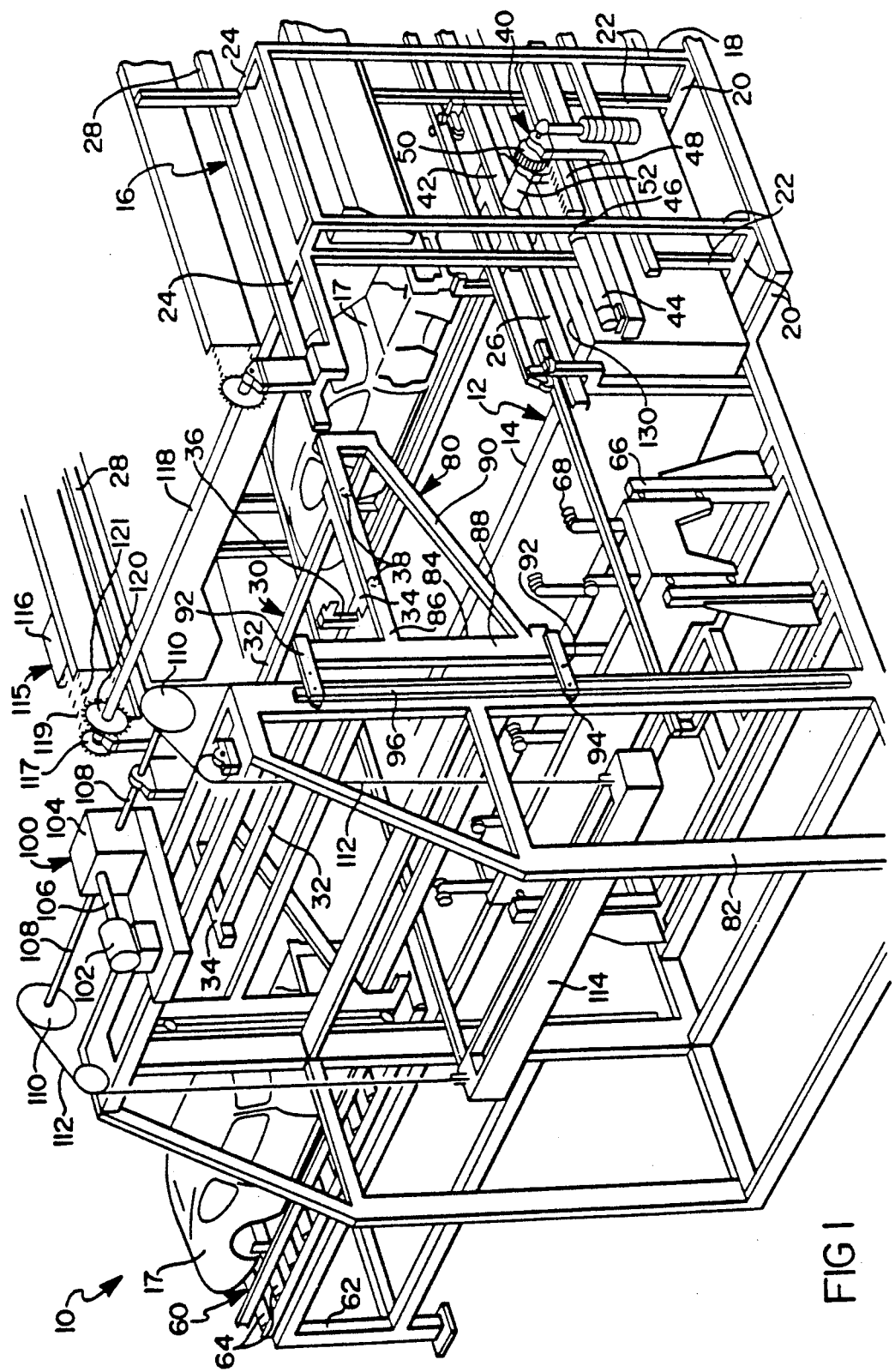
FIG. 1 is a partial perspective view of the subject invention.

In overall concept, the apparatus of this invention has carriers for moving the objects to be treated (such as the automobile bodies illustrated herein) along a lower horizontal level from one treatment tank or station to another. The carrier can h=rotated at each treatment tank and this completely immerses the object in the liquid within the tank. When treatment of the object at the various selected tanks is completed, it is removed from the carrier and transferred to another carrier which transports it to a curing or drying oven, etc. The carrier, from which the object has been removed, is moved on for cleaning to addition wash and rinse stages after which it is raised by a hoist or elevator means from the treatment level to a higher carrier return level. The cleaned carrier is then moved along this upper horizontal level back to the first stage end of the apparatus. Here, it is lowered by a second hoist elevator means from the upper or return level to the lower or treatment level. Another object to be treated can then be secured to the carrier and the cycle repeated.

Each treatment tank of the apparatus has its own independent mechanism for rotating the carrier which is brought to it. The object to be treated is mounted on the carrier so that its drain holes are on the bottom, whereby liquid drains out of it by gravity. Therefore, in the case of an automobile body, it is mounted on the carrier in the upright, road position wherein, it is designed to drain completely. Conversely, when the automobile body is rotated 180 degrees to an inverted, upside down position, complete venting of the drain holes can take place without entrapment of air bubbles. According to the preferred practice of the present invention, the carrier with attached automobile body (or other object), while in a fixed horizontal or indexed position, is rotated at the tank from the road position through 180 degrees. At the 180 degree position, the body is completely inverted and immersed in the liquid in the tank, but the carrier is above the level of the tank. After the desired hold time in the liquid, rotation is either continued or reversed for 180 degrees to bring the body base to the road or upright position over the tank. Rotation of 360 degrees (forward or reverse) through the liquid enables all of the internal and external surfaces of the body to be uniformly exposed to the liquid. Upon return to the upright road position, optimum drainage over the tank is allowed to occur before the carrier with the attached body is moved horizontally to the next stage or, in some cases, a second immersion in the safe tank is actuated.

When various liquid treatments of the body are completed, it is preferably transferred to a second carrier, as mentioned above, which transports the body in preferably an inverted position through the curing and/or cooling chambers. In the case of automobile bodies, sealers and deadeners can then be easily applied during or just after these stages while the body is inverted.

A presently preferred form of apparatus for treating surfaces of an object such as a vehicle body by the process described is generally shown at 10 in FIGS. 1 and 1A. The apparatus 10 includes a process tank assembly, generally indicated at 12, comprising at least one process tank 14 having a fluid or bath therein. Preferably, the process tank assembly 12 includes a plurality of process tanks 14 side by side in a longitudinal row. The process tanks 14 are generally rectangular in both longitudinal and transverse cross-sections and are deep enough to allow complete immersion of all of the object to be treated.

The apparatus 10 also includes a support means, generally indicated at 16, for supporting the object to h=treated (such as automobile body 17) above the tanks 14. The support means 16 includes a support frame 18 adapted to rest upon a support surface such as a floor. A support frame 18 is provided for each process tank 14. The support frame 18 comprises laterally extending floor members 20, vertically extending column members 22 and laterally extending top members 24. The process tank 14 rests upon the floor members 20 while the column members 22 extend vertically along the sides of the tanks 14. The support means 16 also includes a pair of laterally spaced first or lower horizontal rails 26 connected to the support means 16 and extending longitudinally along and above the tanks 14. The support means 16 also includes a pair of laterally spaced second or upper horizontal rails 28 connected to the support means 16 and extending longitudinally along and above the tanks 14 and the rails 26. Rails 26 are on the treatment level and rails 28 are on the return level.

The apparatus 10 further includes carriers or cart means, generally indicated at 30, for moving vehicle bodies 17 from one tank 14 to another. Each carrier 30 comprises a pair of longitudinally spaced and laterally extending side members 32 and end members 34 connected to each end of the side members 32. The end members 34 may have a counterweight portion 35 (FIG. 2) on the bottom side thereof to partially balance the weight of the vehicle body 17 on the upper side and thereby facilitate (by reducing power and stress) the rotation of the carrier 30. A skid or rack frame device (not shown) is fastened to the bottom of the part to be treated (e.g., body 17) and clamped to a pair of vertical supports 36 on the side members 32 at opposite ends of the carrier. This supports a body 17 in vertically spaced relationship to the side and end parameters 32 and 34 of the carrier 30. The end members 34 of the carrier 30 have rollers 38 disposed inside of the channel-shaped rails 26, 28 for allowing the carrier to roll or move along the rails 26, 28. The rails 26 act as a guide means for guiding each carrier 30 with a vehicle body 17 in moving downstream in processing along the tanks 14.

Figure 2:
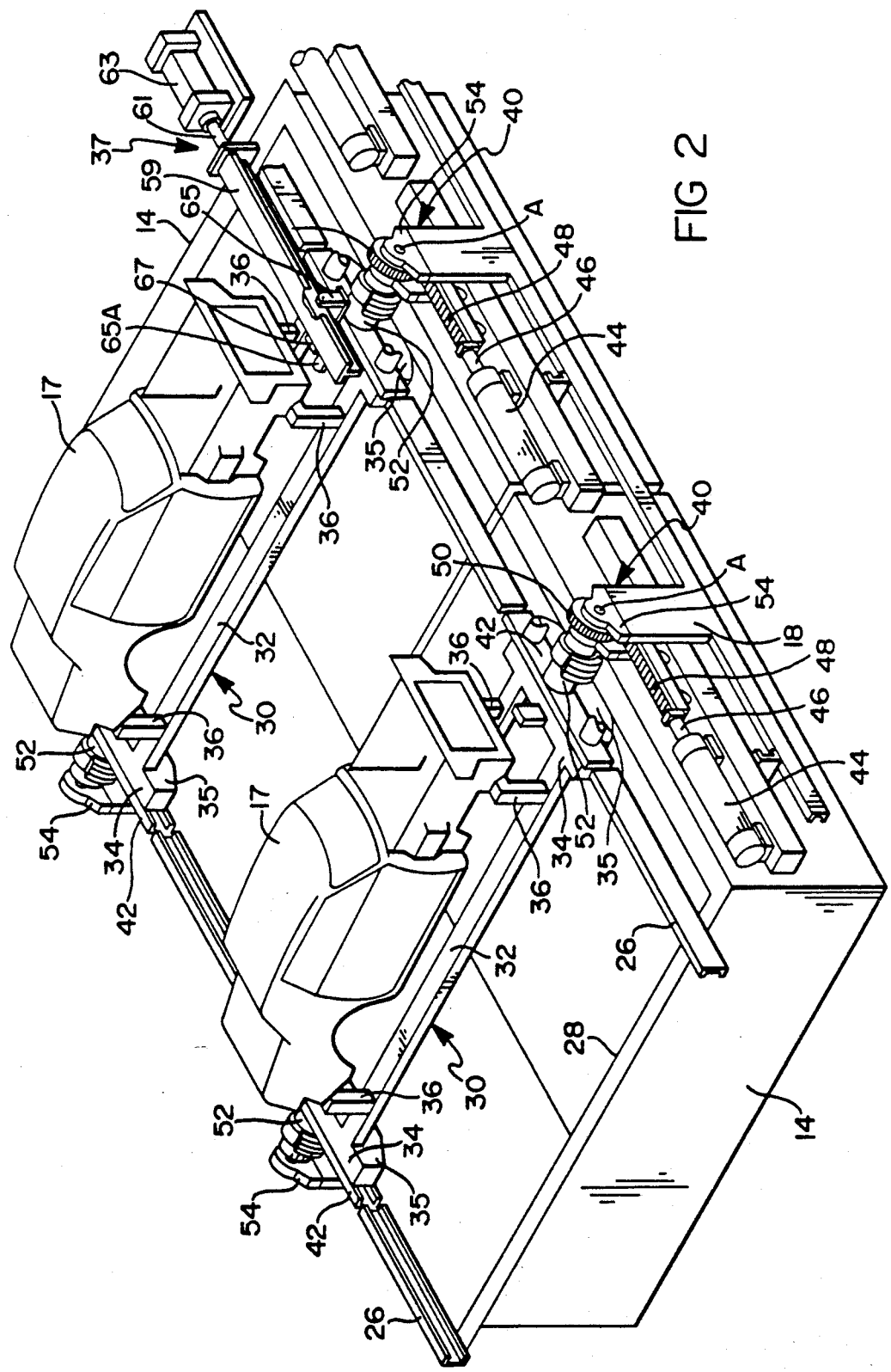
FIG. 2 is a partial perspective view of the rail and rotating mechanism of the subject invention.

As indicated in FIG. 2, an indexing means 37, described hereinafter, indexes or moves the carriers 30 along the rails 26 from one tank 14 to the next.

As illustrated in FIG. 2, the apparatus 10 includes rotating means, generally indicated at 40, for selectively rotating the vehicle body 17 between a first or upright road position above the tanks 14 and a second or fully inverted, upside down position within the tanks 14. The rotating means 40 allows the cart means 30 and attached vehicle body 17 to be rotated 180 degrees to the inverted position, to completely and uniformly immerse all surfaces of the vehicle body 17 at one time. Thereafter, rotation can be reversed or continued for 180 degrees (360 degrees total) to bring the body 17 back to the upright or road position. As illustrated, the rails 26 are discontinuous at each tank 14 along the length thereof. For this purpose, a section 42 of rail 26 directly above each tank 14 is a separate piece from the rest of rail 26 to allow the section 42 to be rotated to thereby rotate carrier 30 and the body 17. The rotating means 40 may comprise a cylinder 44 and piston 46 assembly connected to the support frame 18 and a rack 48 connected to one end of the piston 46. The rotating means 40 further comprises a complimentary gear 50 affixed to a shaft 52 on the section 42 and engaging the rack 48 to allow the section 42 to h=rotated upon actuation of the cylinder 44 and piston 46 assembly. One end of the shaft 52 is affixed to the section of rail 42 and the other end is journaled by a support member 54 secured to frame 18 so that each rotating means 40 is supported by the support frame 18. The rotating means 40 is preferably designed to have a speed that can be varied and automatically controlled and programmed.

Figure 6:
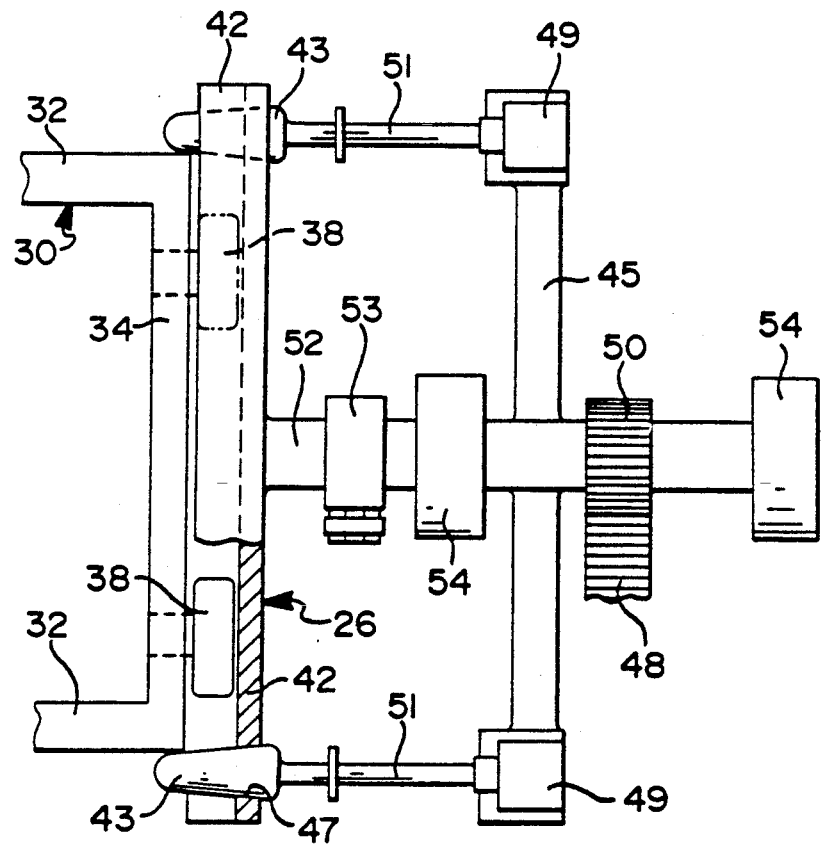
FIG. 6 is a partly schematic plan view of the locking assembly.
Figure 7:
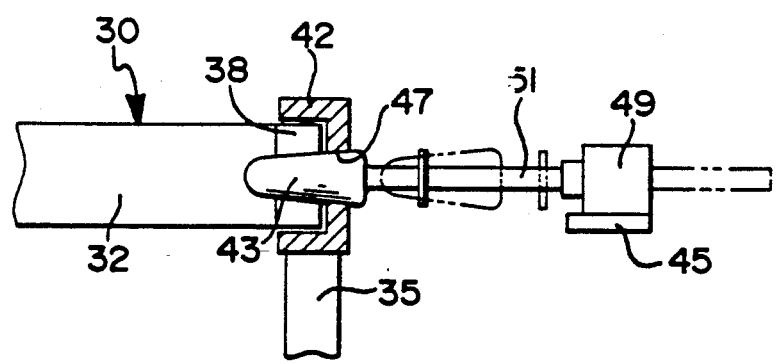
FIG. 7 is a side elevation taken from the bottom of FIG. 6.

The carrier 30 may h=rotated about the axis A' (FIG. 3) of shaft 52 when the rollers 38 are disposed inside of rail sections 42. Suitable stop means, such as a pair of tapered slidable lock pins 43 on lock pin support frame 45 (FIGS. 6 and 7) are provided to extend through openings 47 in the section 42 on opposite sides of rollers 38 and serve to hold the rollers and carrier in section 42 during rotation. The frame 45 is mounted on shaft 52 to rotate with it and supports hydraulic cylinders 49 having reciprocable piston rods 51 that carry the lock pins 43. The retracted position of the lock pins 43 is shown in phantom lines in FIG. 7. The lock pins 43 provide a grounding circuit between the carrier and the shaft 52 which carries a grinding disc 53 (FIGS. 8 and 9) that is connected through brushes 55 to the system ground 57.

Figure 3:
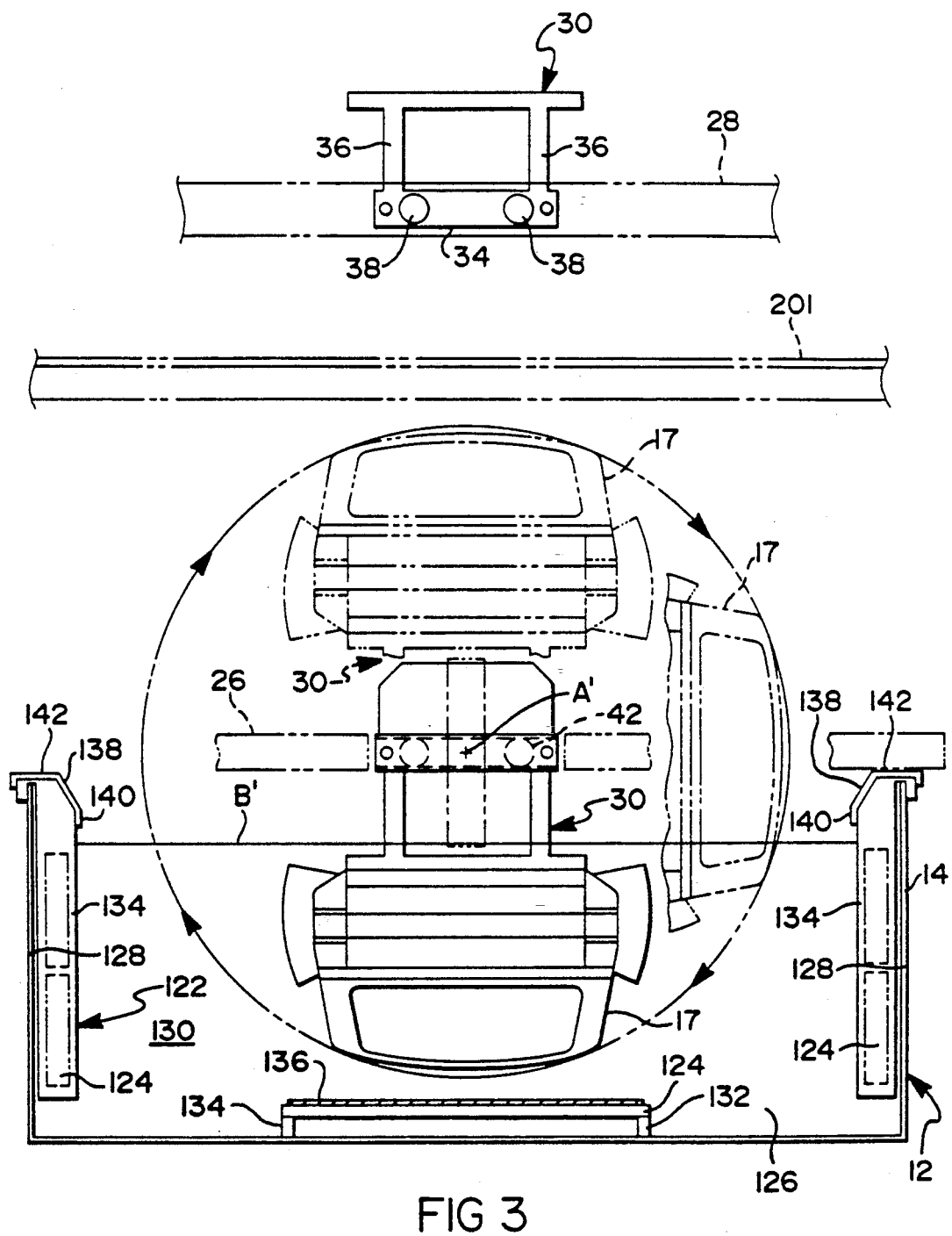
FIG. 3 is partly an elevational and partly a vertical sectional view illustrating the roll immersion feature of the subject invention along with a part of the enclosure and a carrier being returned to the load station.

As illustrated in FIG. 3, the axis A' of shaft 52 is spaced above the fluid level B' and very close to the top of the tank 14 and its space above it just enough to prevent cost of the carrier 30 from being immersed at all in the fluid of the tank 14. The rotating means 40 and lock pin cylinders 49 are programmable controlled (not shown) which allows multiple rotations (within angular limits determined by the lengths of racks 48 and/or the rods 46) and controlled speed at each tank 14 for selective control. Further, the carrier 30 and vehicle body 27 may be indexed to the next tank 14 without rotation so that rotation is independent of indexation.

Carriers 30 are indexed along rails 26 by index mechanisms 37 at the front and rear of the tanks 14, the mechanisms being illustrated schematically in FIGS. 2, 4 and 5. Each mechanism includes a long, reciprocable T-bar 59 that is indexed or retracted by virtue of its connection to the rod 61 of an hydraulic cylinder 63. Angle shaped brackets 65 extend downwardly from the stems of the T-bars and have horizontal arms 65A that are in alignment with vertical indexing posts 67 fixed on the front and rear ends of the carriers 30 along the midline of the carrier, i.e., directly above the axes of shafts 52. FIG. 4 shows two carriers 30 centered over adjacent tanks 14A and 14B. It is clear that these carriers can be rotated 180 degrees in a clockwise direction for immersion of an object (not shown) carried by them. If the final 180 degrees is clockwise the brackets 65 can be retracted (moved to the left in FIG. 4) as indicated by the shaded brackets 65'. On the other hand indexing or movement to the right when the carriers 30 are nonrotatable will enable the brackets 65 to engage the posts 67 and pull the carriers the desired (programmed) distance to the right, i.e., to the next stage of processing.

As illustrated in FIG. 1, the apparatus 10 includes loading means, generally indicated at 60, for loading the vehicle body 17 (which may include a skid or rack on which the body is fastened) upon the carrier 30. The loading means 60 is on substantially the same vertical level as rails 26 and includes a support stand 63 having a plurality of laterally spaced roller bars 64 to movably support the body. The loading means 60 further includes a receiving stand 66 also having pairs of laterally spaced rollers 68. The vehicle body 17 is placed on the roller bars 64 of the support stand 62 and moved laterally across the roller bars 64 and 68 until it can be clamped to a carrier 30 that is in alignment vertically with the rails 26 whereby it can be indexed to the first tank 14.

The apparatus 10 further includes an unloading means 60A (FIG. 1A) at the other end of rails 26 and tanks 14 for unloading the bodies 17. The unloading means 60A is similar to the loading means 60 (e.g., see stand 62A and rollers 64A).

As illustrated in FIG. 1, the apparatus 10 includes a hoist or elevator means, generally indicated at 80, for moving the carrier 30 vertically between the upper return rails 28 and the lower, treatment rails 26. There is an elevator means 80 at each end of a plurality of tanks connected serially and therefore beyond the ends of rails 26 and 28 so that rollers 38 can h=rolled out of the ends of the rails 26, 28 onto the elevator means 80. The elevator means 80 includes a frame 82 and a movable cart 84 movable vertically along the stationary frame 82. The movable cart 84 includes a pair of laterally spaced receiving rails 86 to receive the rollers 38 of the carrier 30. The receiving rails 86 are connected to a vertical xember 88 in a conventional manner and a diagonal member 90 interconnects the receiving rail 86 and vertical member 88 at one end thereof. A horizontal xember 92 is connected to each and of the vertical members 88. A roller 94 is connected at one end of each horizontal member 92. The rollers 94 roll along vertically on a vertical rail 96 connected to the stationary frame 82.

The stationary frame 82 supports an overhead drive mechanism, generally indicated at 100, for moving the movable cart 84 between the upper and lower positions. The drive mechanism 100 comprises a motor 102, a transmission 104, a longitudinal shaft 106 interconnecting the motor 102 and transmission 104, and lateral shafts 108 extending laterally from the transmission 104. Pulleys 110 are connected to the ends of the lateral shafts 108. Cables 112 ride across the pulleys 110. One end of each cable 112 is connected to the cart 84 and the other end is connected to a weight 114 which acts as a counterbalance to the weight of the cart 84 and carrier 30.

A carrier return means, generally at 115, is connected to the support means 16 to provide for return movement of carriers 30 from the downstream end back to the upstream end along upper rails 28. As mentioned above, the elevator means 80 (FIG. 1A) hoists the carriers 30 from rails 26 to the rails 28 to allow them to return to the upstream end of the tanks 14. The return means 115 comprises a motor 116, a sprocket 117 connected to laterally extending shaft 118, and a first chain 119 interconnecting the motor ° 116 and sprocket 117. A second sprocket 120 is disposed about the shaft 118 at each end of the second rails 28. A second chain 121 interconnects the second sprocker 120. The vertical posts on the carriers 30 engage the second chain 11 whereby the carriers are moved along the second rails on an upper level over the treatment tanks 14 from the unloading or discharge end of the apparatus back to the loading or receiving end.

As illustrated in FIG. 3, one or more of the process tanks 14 may be used for electrodeposition or the like. The process tank 14 includes electrode means, generally indicated at 122, disposed in the tank 14 about the vehicle body 17 when the vehicle body 17 is in the inverted position for electrodepositing a material on the surface of the vehicle body 17. The electrode means 122 preferably comprises at least one electrode 124 on each of the bottom 126 vertical sides 128 and front and rear end walls 130 of the tank 14. An electrode support means 132, 134 supports the electrodes 124 in spaced relationship from the bottom 126, sides 128 and end walls 130, respectively. A grating 136 is disposed over the electrode 124 for the bottom wall to protect educator piping (not shown) for the tank. A removable guard and drip cover 138 for the top edges of the tank 14 has one end 140 disposed over the supports 132 and the other end 142 disposed over the tops of the side and end walls 128 and 130.

IN OPERATION

As illustrated at the receiving end of the apparatus 10, a vehicle body 17 (which may be on a skid) is placed on the roller bars 64 of the support stand 62. A carrier 30 has been lowered by the movable cart 84 of the elevator means 80 and is in alignment with the rails 26 such that the body 17 can be moved on rollers to rest upon the carrier 30 and be clamped to it. Index means 37 is actuated to move the carrier 30 and body 17 longitudinally on rails 26 to the first treatment station. The lock pins 43 are actuated to hold the carrier centered in rail section 42. Then the rotating means 40 is actuated so that the cylinder 46 and piston 46 assembly move the rack 48 to rotate the gear 50. The gear 50 rotates the shaft 52 which, in turn, rotates the rail section 42. The rail section 42 with body 17 is first rotated 180 degrees so that the originally upright vehicle body is completely immersed in an upside down condition below the level B' of the fluid in the tank 14, as illustrated in FIG. 3. At this time, treatment, such as electrodeposition, may occur. The vehicle body 17 through rail section 42 is then rotated another 180 degrees in either the same or the reverse rotary direction for a total of 360 degrees to the upright position above fluid level B' of the tank 14 and held to allow drainage back into the tank. The rotation may be repeated in the safe or opposite directions or any combination as desired to achieve optimum coating and drainage. When treatment at this tank is completed the carrier 30 is then indexed downstream to another tank 14 for further processing. This may or may not be the next tank in line. After processing in tanks 14 is finished, the carrier 30 and body 17 are indexed longitudinally to a drain and transfer station "S" in FIG. 10) adjacent the discharge end of the apparatus 10. The vehicle body 17 is unloaded from the carrier 30 and clamped to another carrier (not shown) for transfer to a hot zone for drying, curing, etc. The vacated carrier 30 is cleaned, rinsed and indexed into and received by the movable cart 84 of the elevator means 80 at the downstream end of the apparatus 10. (See station "V" in FIGS. 10 and 11). The elevator means 80 hoists the carrier 30 vertically to the second pair of rails 28. The carrier 30 engages the second chain 121 and is then returned along the upper rails 28 to be received by the elevator means 80 at the upstream or loading end. The elevator means 80 takes the carrier 30 down to the receiving stand 66 to pick up another vehicle body 17. The cycle may then be repeated.

Figure 10:
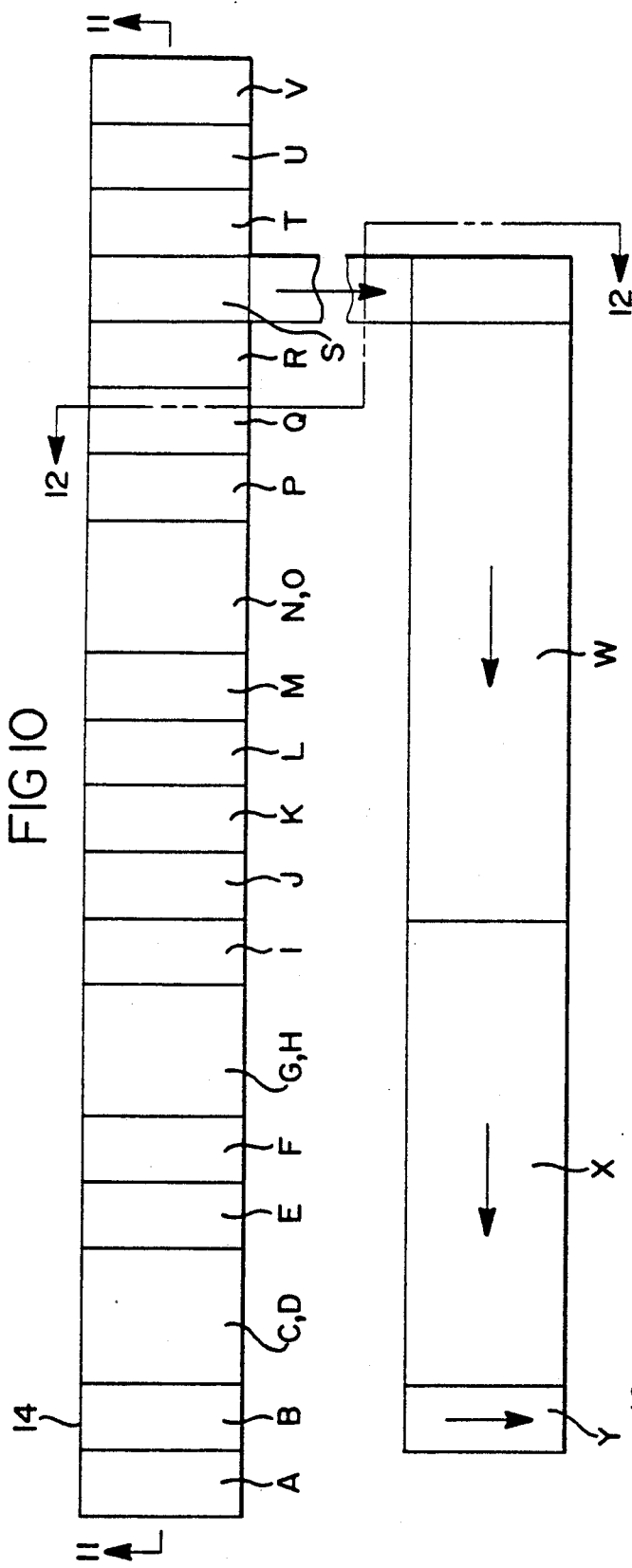
FIG. 10 is a processing schematic of the subject invention.
Figure 11:
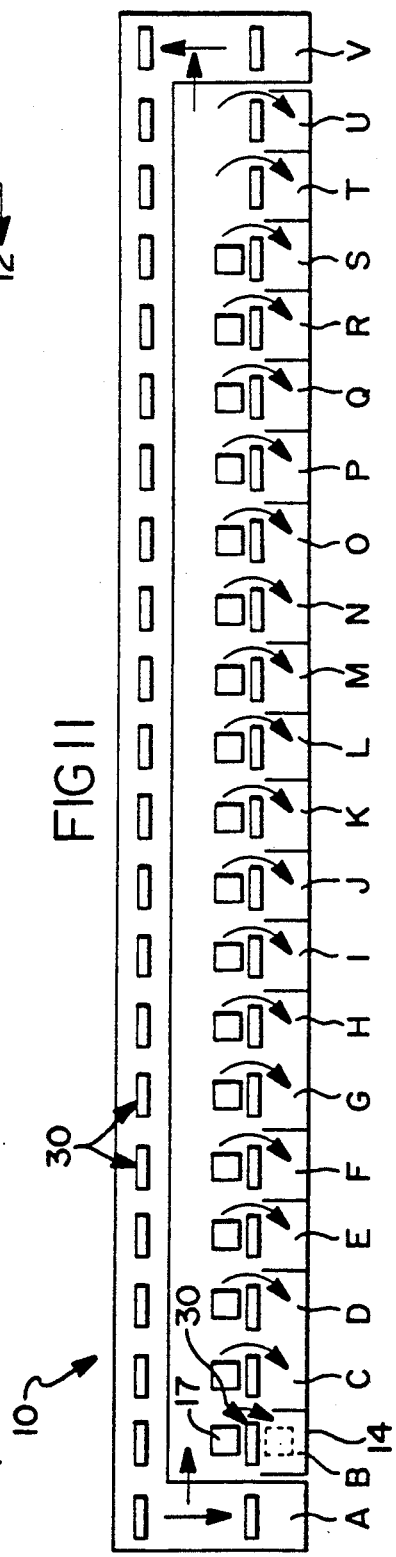
FIG. 11 is a schematic view taken as a sectional view taken along line 11—11 of FIG. 10.

Referring to FIGS. 10 and 11, a complete process cycle for roll immersion electrocoating treatment of a vehicle body 17 is illustrated. This includes a loading station A, treatment stations B through R, drain and transfer the body 17 station S, cleaning and up-transfer of the carrier stations T, U, and V, after-treatment of the body 17 stations W and X, and unloading of the finished body station Y. By way of illustration, the nature of the operations, the length of the tank 14, the time of treatment at the station (or stations) and the number of rotations at each station are set out in Table I. The overall length of the equipment 10 to provide these stations is about 396' and the typical time for processing at each station is about 2 minutes. Thus, a production of about 30 bodies per hour is anticipated.

TABLE I

| | Typical Process Cycle for Electrocoating | | | |
|---|---|---|---|---|
| | STATION | LENGTH | TIME (min.) | # ROTATIONS |
| A | LOAD | 18'-0' | 2.0 | — |
| B | SPRAY CLEAN | 18'-0' | 2.0 | 1 |
| C, D | DIP CLEAN | 36'-0' | 4.0 | 2 |
| E | DIP RINSE | 18'-0' | 2.0 | 2 |
| F | SPRAY RINSE | 18'-0' | 2.0 | 1 |
| G, H | DIP ZINC PHOSPHATE | 36'-0' | 4.0 | 2 |
| I | DIP RINSE | 18'-0' | 2.0 | 2 |
| J | DIP CHROME SEALER | 18'-0' | 2.0 | 1 |
| K | SPRAY D.I. RINSE | 18'-0' | 2.0 | 1 |
| L | DIP D.I. RINSE | 18'-0' | 2.0 | 2 |
| M | DRAIN | 18'-0' | 2.0 | 1 |
| N, O | ELECTROCOAT | 36'-0' | 4.0 | 2 |
| P | SPRAY PERMEATE RINSE | 18'-0' | 2.0 | 1 |
| Q | DIP PREMEATE RINSE | 18'-0' | 2.0 | 2 |
| R | D.I. DIP RINSE | 18'-0' | 2.0 | 2 |
| S | DRAIN/TRANSFER BODY | 18'-0' | 2.0 | — |
| T | DIP CLEAN CARRIER | 18'-0' | 2.0 | 1 |
| U | DIP RINSE CARRIER | 18'-0' | 2.0 | 2 |
| V | UP TRANSFER CARRIER | 18'-0' | — | — |

Figure 12:
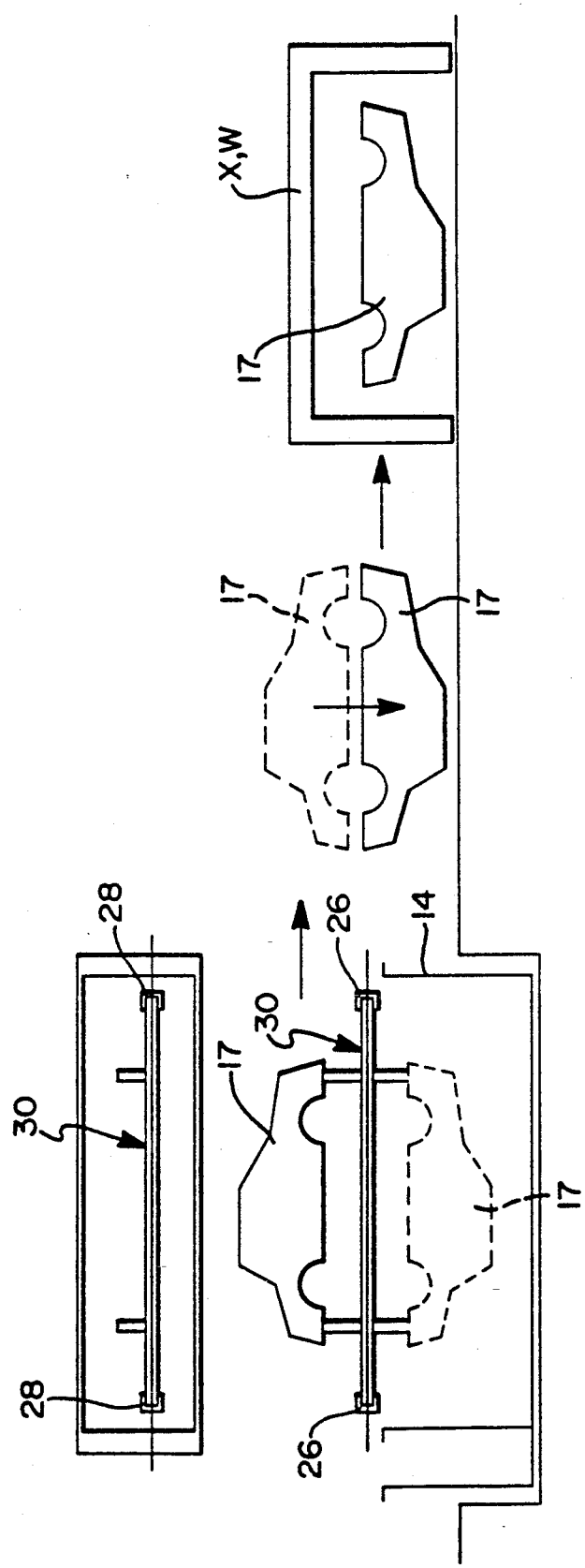
FIG. 12 is a schematic view taken as a sectional view along the line 12—12 of FIG. 10.

The body 17 which is rigid from carrier 30 at station S is coated with wet surface treatment material. It is transferred to another carrier (not shown) which is inverted to turn the body upside down, as illustrated in FIG. 12. The carrier and inverted body are moved into an oven X, W which may have a length of about 290', as is more readily appreciated by consideration of FIG. 10. Table II illustrates the several treatments to the body 17 that are applied as it leaves station S and goes through the oven W, X to reach the final unload station Y.

TABLE II

Typical Cure Bycle for Electrocoating

| OPERATION | LENGTH | TIME |
|---|---|---|
| LOAD AND INVERT | 10'–0' | — |
| PRE-HEAT | 50'–0' | 10 min. |
| CURE | 100'–0' | 20 min. |
| AIR SEAL | 20'–0' | 4 min. |
| COOL-DOWN | 50'–0' | 10 min. |
| UNDER-COAT AND SEAL | 50'–0' | 10 min. |
| UNLOAD | 10'–0' | — |

It will now be recognized that the invention provides an apparatus 10 to pre-treat and paint, or otherwise surface process various objects that are difficult to vent and drain, such as automobile, truck or vehicle bodies, engine blocks, transformer housings, etc. The body 17 (or other part) to h=treated is ordinarily pre-attached to a skid or similar racking device which, in turn, is clamped to a movable carrier 30. Each carrier can be rotated through 360° to fully and uniformly immerse the body in a tank 14 without immersing very much of the carrier. The carriers are indexed from one processing station to the next with the body 17 in the "road" or upright position. When the carrier reaches the next processing station it is again rotated 180° to invert the body for the desired processing time, after which it is rotated so that the body is upright again and treatment liquids can drain back into the tank.

Since car bodies are designed to drain completely in the "road" position, this means that they will vent completely in the inverted or 180° treatment position provided by this invention. This provides for maximum elimination of trapped air bubbles so that all surfaces have substantially equal process time. Elimination of air pockets produces improved surface preparation since all surfaces of the body can be fully vented and drained and completely wetted for cleaning, rinsing, painting, or other processing. Due to the 360° rotation, all surfaces of each body are immersed in dip treatment for the same time, meaning that they are all treated the same to provide uniformity and repeatability.

At each treatment station, the body can vent completely (180° position) and drain completely (upright position). It can be rotated in either direction and more than once at each station at any time in the cycle and at different speeds and dwell times and be held in different angular positions if that is desired. During each rotation, it is completely filled with fresh bath material. Since there are separate rotating mechanism 40 at each tank or station, plural rotations can be programmed for each tank (with delayed entrance and early exit) without affecting other timing. The power operated devices for moving the carriers, rotating the carriers, moving the latch pins, etc., can all be automatically operated in a programed manner to achieve proper timing, sequencing, and treatment for each successive body.

Because of the complete venting and draining during each rotation, the volume of dragout is drastically reduced so that all the process baths stay cleaner and the costs of chemical and volume of rinse water is reduced. Because there is no moving mechanism (other than the central parts of the carriers) over the tanks 14, there is less possibility of dirt and grease falling into the tanks or onto the bodies, as compared with other systems. Also, because the carriers 30 do not go through the curing and cooling stages (W and X), but are cleaned and rinsed (stations T and U) after each complete cycle, there is substantially no build-up of paint or chemicals on the carrier which could flake off and fall into the tanks or onto freshly treated surfaces of a body 17. The need for and expense of carrier stripping equipment are also eliminated. Preferably, a full enclosure around all the tanks 14, including a top 201 (FIG. 3) to act as a drain pan below returning carriers on the upper level, is provided. The enclosure would be completely ventilated with exhaust fans and a filtered air supply. The enclosure would minimize contamination of the processing fluids by room air and dirt, etc.

Any station can be arranged as a dip or spray mode. The dip stations can be equipped with agitation means and/or ultrasonic transducers as deemed desirable. The spray stages can have either fixed or oscillating spray nozzles as desired. If there is a spray operation, the ability to rotate the full 360° during spraying provides optimum rinsing and treatment inside and out.

As described in connection with FIG. 3, the invention allows the placement of electrodes on all four sides of the tank 14 and on the bottom and, thus, on all four sides of the inverted body 17 and the top of the inverted body. This provides for an improved and optimum film build-up on the outer cosmetic surfaces (sides and top) because of the closeness of the electrodes. It is not necessary to have secondary electrodes in order to have equal film build up on top of the body. The exterior surfaces which require maximum film build-up are closest to the electrodes, and the interior surfaces which require minimum film build-up are furthest from the electrodes. Therefore, it is not necessary to deposit excess paint on the unneeded surfaces in order to build up the required film on the outside surfaces. This reduces overall paint consumption and paint cost per body.

Since the body is processed in the inverted position, fewer paint blemishes due to liquid borne particles can occur. All cosmetic surfaces are either vertical or facing downward (e.g., top of the body) so that any dirt particles in the process solution will tend to settle on the bottom of the tank or the inside, non-cosmetic surfaces of the body. During curing and cooling (stations W,X), the body 17 is also upside down, so that any air borne dirt falls away from all cosmetic surfaces to provide a superior prime surface for the to-coat finishing system. Since the cured and cooled body will be delivered in the inverted position, the sealer and deadener can be easily applied without additional inverting mechanism or additional floor space.

For electrodeposition painting, multiple tanks (e.g., stations N and 0) can be used at the same or increasing voltages for denser and/or thicker film deposits. Variable tires for any stage (e.g., stations C and D, or G and H) can be accommodated by using a larger tank of multiples of the indexing distance so that the body can be moved in either the up or down positions for superior programmability.

Compared to monorail systems, the tanks 14 are very small (about one third the size), which reduces charging costs and improves turnover tiles on electrodeposition tanks. This improves painting consistency and reduces equipment size and costs (Pumps, filters, piping, etc.). Further, since most heated tanks are of the immersion type, heating requirements are reduced to also reduce operating costs. The smaller tanks greatly reduce floor space requirements (by perhaps two thirds) as compared to a comparable monorail system. The reduced tank size also reduces transport time between stations, thereby reducing drying between stations and giving improved post-rinsing for electrodeposition painting. There is also less opportunity to rust between pretreatment stations.

Multiple color painting or variable pretreatment processes can be accomplished in the apparatus 10 simply by transporting the carrier 30 in the up position over the undesired stations.

While the invention has been described in connection with the coating of objects that are ordinarily made of steel or iron (e.g., automobile bodies), it can also h=used to surface treat objects made of other materials, such as aluminum.

Accordingly, it may be seen that the invention provides for a better quality of processing, better rinsing and reduced contamination, better painting quality, greater flexibility, and reduced original equipment, operation, and maintenance costs, as compared with conventional high-production methods and equipment for surface treatment of complex parts such as vehicle bodies.

Modifications in the structures, methods and processes described above and shown in the drawings may be made without departing from the spirit and scope of the invention.

What is claimed is:

1. In a processing apparatus for surface treatment of vehicle bodies or the like, support means, a process tank assembly inside the support means comprising a plurality of process tanks adapted to have treatment liquids for said surface treatment therein, means on the support means defining a first level for treatment of bodies processed by the apparatus, means on the support means defining a second level located vertically above and parallel to the first level, carrier means on the support means movable on the first level above said process tanks for supporting a body to be processed above said tanks and movable with the body along said tanks to carry said body along said first level from one tank to the next, indexing means on the support means and operatively connected to the carrier means for moving the carrier means on said first level along said tanks, rotating means on the support means at each tank and operatively connected to the carrier means for selectively rotating the carrier means and a body on the carrier means between an upright position above the liquid level of the tank and an inverted position wherein the body is completely below the liquid level of such tank, said carrier means being positioned substantially entirely above said liquid level when said body is completely below such liquid level, said carrier means having an axis of rotation above the liquid level of said tank, said support means having a first end for the loading of bodies into the apparatus and a second end opposite to the first for the discharge of bodies treated in the apparatus, said apparatus including loading means at said first end for loading the body into the apparatus and upon said carrier means, said apparatus including a carrier return means on said support means located on said second level, and elevator means on said support means at the first and second end thereof for moving the carrier means vertically between said first and second levels.

2. In a processing apparatus as set forth in claim 1 wherein said means on the support means defining a first level comprises a pair of laterally spaced rails extending longitudinally along said tanks, said carrier means having rollers riding on said rails.

3. In a processing apparatus as set forth in claim 2 wherein said rotating means at each tank includes separate rotatable sections of said rails over the respective tanks and cylinder and piston and rack assemblies connected to said rotatable sections to rotate said sections.

4. In a processing apparatus as set forth in claim 3 wherein said support means includes stationary support members at ends of each tank, said rotatable sections being rotatably supported on said support members.

5. In a processing apparatus as set forth in claim 1 said carrier means comprising a pair of longitudinally spaced side members, an end member connected to each end of said side members, and post means mounted on said side members to support the body in vertically spaced relationship to said side members.

6. In a processing apparatus as set forth in claim 5 wherein said means on the support means defining a second level comprises a second pair of laterally spaced rails extending longitudinally along said tanks above said first rails and providing a return path for said carrier means from a downstream end of the tank assembly back to an upstream end where untreated bodies are loaded on the carrier means.

7. In a processing apparatus as set forth in claim 6 including powerized return means for moving said carrier means along said second rails.

8. Apparatus as set forth in claim 1 wherein said rotating means is power operated to rotate the carrier means at a selected speed and direction through a selected angle and to hold the carrier in a selected position for a selected time.

9. Apparatus as set forth in claim 8 including power operated lock pin means for holding the carrier means in alignment with its axis of rotation for a selected time.

10. Apparatus as set forth in claim 9 including power operated index means operatively connected to the carrier means for selectively moving the carrier means from one tank to another at a selected time and speed.

11. In a processing apparatus for vehicle bodies, a process tank assembly comprising at least one process tank for holding a fluid therein, a carrier for holding a body to be processed in the upright road position above the fluid in the tank support means for supporting the carrier and body above the fluid level of said tank, rotating means for rotating the carrier and body between said upright position wherein the body is entirely above the fluid level of said tank and an inverted position wherein the body is entirely below the fluid level of said tank and upside down and the carrier is substantially entirely above the level of fluid in the tank, and electrode means disposed in said tank about the body in said inverted position to provide means for electrodepositing a material on the body while inverted in said tank, said tanks being rectangular and having a bottom side and end walls, said electrode means comprising at least one electrode on each of said bottom, side and end walls.

12. In a processing apparatus for vehicle bodies or the like, a process tank assembly comprising at least one process tank for holding liquid electrocoating material, said tank having a bottom, side and end walls, electrodes in said tank on said side and end walls and bottom for deposition of said material on the body to be processed, electrode support means for supporting said electrodes in spaced relationship from said walls and bottom, a grating disposed about one side of said electrode on said bottom wall, a removable corner disposed about the top end of said electrodes on said side and end walls and having one end disposed over said side and end walls.

13. A method of treating a vehicle body or the like having drain holes on the bottom side of the body comprising the steps of: supporting a body in an upright position above the liquid level of a liquid within a first tank so that the drain holes of the body are on the bottom facing downwardly; selectively rotating the body through a first angle of substantially 180 degrees between said upright position above the liquid level of the first tank and an inverted immersed position in which the body is completely below the liquid level of the first tank sand said drain holes in the body are facing upwardly but are below the level of liquid in the tank; and then rotating the body through a second angle of substantially 180 degrees to said upright position so that the body may be rotated through a total angle of substantially 360 degrees and so that said drain holes in the body are again above the level of liquid in the tank and facing downwardly.

14. A method as set forth in claim 13 wherein said body is rotated in one rotary direction the said first 180 degrees and then is rotated in the same rotary direction through said second 180 degrees.

15. A method as set forth in claim 13 wherein said body is rotated in one rotary direction through said first 180 degrees and then is rotated in the reverse rotary direction through said second 180 degrees.

16. A method as set forth in claim 13 including the step of holding the body in the upright position after immersion to allow drainage of liquid from the body back into the tank.

17. A method as, set forth in claim 13 including holding the body during rotation against horizontal translation relative to the tank.

18. A method as set forth in claim 17 including indexing the body by horizontal translation to a second tank containing a liquid after said 360 degree rotation and drainage at the first tank and repeating the 360 degree rotation and draining at the second tank.

19. A method as set forth in claim 18 including additionally treating the body at additional tanks by rotating it through 360 degrees in the liquids in each of said tanks and wherein the body is inverted and immersed completely below the liquid in each tank and thereafter horizontally moving the body while in an inverted position through an oven means at a temperature and for a time to dry the coating applied to the body by the liquids.

20. A method as set forth in claim 13 including providing electrodeposition of material on the body when the body is in the inverted position.

21. In a processing apparatus for vehicle bodies or the like, said apparatus having a receiving end for receiving bodies to be processed and a discharge end for discharging bodies after processing, a process tank assembly comprising a series of process tanks for holding liquids therein, a carrier for supporting a body in an upright position above said tanks and for moving the body in such position from one tank to another, means for attain the body to said carrier, loading means adjacent said receiving end for loading the body upon said carrier, unloading means adjacent said discharge end for unloading the body from said carrier, elevator means adjacent the receiving end and the discharge end for moving a carrier vertically between a first treatment level and a second return level, said carrier having a longitudinal axis, power operated rotating means for selectively rotating said carrier and attached body at a selected speed about said axis at each of said tanks between an upright body position completely above the liquid level of said tank and an inverted body position completely below the liquid level of said tank, treatment guide means for guiding said carrier to move across said tanks in a treatment direction along the treatxent level from one end of the apparatus to the other, power operated index means for selectively moving the carrier along said guide means for a selected distance at a selected speed, said guide means comprising a first pair of laterally spaced rails at treatment level extending longitudinally along said tanks, said first pair of rails having rotatable separate sections above each of said tanks, said carrier including rollers at each end disposed in said rails for allowing said carrier to move along said rails, power operated stop means for selectively holding a carrier in said rotatable separate sections during rotation and for releasing said carrier to permit movement thereof along the guide rails, said rotating means being operatively connected to said separate sections to rotate said sections with a carrier thereon, return guide means for guiding said carrier to move on a return level in a return direction above said tanks, and power operated means for moving a carrier along said return guide means from the discharge end back to the receiving end of the apparatus.

22. An apparatus as set forth in claim 21 including automatic means at said discharge end for cleaning a carrier after a body is unloaded from it and before it is returned to the receiving end.

23. An apparatus as set forth in claim 22 including oven means for preheating, curing, and cooling a body removed from said carrier, and means for transferring a body from said carrier and transporting it through said oven means in an inverted position.

24. An apparatus as set forth in claim 23 including means comprising portions of said rotating means and said stop means for electrically grounding said carrier when it is over a tank.

25. A method of dip treating a vehicle body or the like having a bottom side and drain holes in said bottom side comprising supporting a body in an upright road position completely above the level of liquid in a tank and with said drain holes above and facing the liquid in the tank, selectively rotating the body about an axis of rotation to the level of liquid in the tank until the body is completely immersed in the liquid and the drain holes are below the level of liquid and facing upwardly to facilitate venting, and then rotating the body about said axis of rotation to said upright road position completely above the level of liquid in the tank with said drain holes facing downwardly over the liquid to facilitate drainage into the tank.

26. A method of treating a vehicle body or the like which comprises loading a first vehicle body on a carrier, moving the carrier horizontally with the body in an upright position until the carrier is over a first tank containing a treatment liquid, holding the carrier against horizontal movement and rotating it until the body is upside down and completely immersed in the liquid, continuing rotation of the carrier until the body is again in an upright position, draining the body into the first tank, horizontally moving the carrier with the body in an upright position until the carrier is over a second tank containing treatment liquid, repeating the rotation of the body and drainage at the second tank, separating the body from the carrier and transporting it in an inverted position through a zone at an elevated temperature to apply heat to the coatings on the body from the liquids, cleaning the carrier, raising the carrier to a higher level, horizontally moving the carrier at the higher level back toward the first tank, and lowering the carrier and loading a second vehicle body on it for processing in said tanks.

27. Apparatus for roll immersion treatment of a vehicle body or the like having a bottom side with drain holes opening out of the bottom side comprising a process tank large enough to hold the entire body to be treated and adapted to hold a treatment liquid in it of sufficient depth to allow the body to be completely submerged in the liquid, a structural framework around the tank, a carrier for the body supported on the framework for rotation about a horizontal axis that is parallel to the level of liquid in the tank and spaced a substantial distance above said level, said carrier being rotatable between a drainage position wherein the body is entirely out of the liquid and a treatment position spaced 180 degrees from the drainage position wherein the body is entirely submerged in the liquid, means on the framework to provide rotation of the carrier, said carrier comprising a substantially rectangular frame that is substantially horizontal and coplanar with said axis of rotation and rotatable about it, said substantially rectangular frame having vertical posts on its adapted in drainage position to support the body in spaced position vertically above the frame with said bottom side spaced above the frame and said drain holes above and facing the liquid in the tank, said posts having a length such that upon rotation of the carrier frame through 180 degrees from the drainage position to the treatment position the body will be completely immersed in the liquid but the frame will be entirely out of the liquid whereby the frame at all times remains above the level of liquid in the tank, in treatment position said carrier supporting the body in an inverted position with said drain holes on top but below the level of liquid in the tank whereby said liquid can enter said drain holes and air trapped in the body can be vented from said drain holes.

* * * * *